(12) United States Patent
Teich et al.

(10) Patent No.: US 6,882,431 B2
(45) Date of Patent: Apr. 19, 2005

(54) QUANTUM OPTICAL COHERENCE TOMOGRAPHY DATA COLLECTION APPARATUS AND METHOD FOR PROCESSING THEREFOR

(76) Inventors: Malvin C. Teich, Montgomery St., Boston, MA (US) 02116; Bahaa E A. Saleh, Butterfield Rd., Lexington, MA (US) 02420; Alexander V. Sergienko, Massachusetts Ave., Boston, MA (US) 02115; Ayman F. Abouraddy, 867 Beacon St., Boston, MA (US) 02215; Magued B. Nasr, 84 Gardner St., Allston, MA (US) 02134

( * ) Notice: Subject to any disclaimer, the term of this patent is extended or adjusted under 35 U.S.C. 154(b) by 316 days.

(21) Appl. No.: 10/304,985

(22) Filed: Nov. 26, 2002

(65) Prior Publication Data

US 2004/0100637 A1 May 27, 2004

(51) Int. Cl.[7] ................................................. G01B 9/02
(52) U.S. Cl. ........................................................ 356/497
(58) Field of Search ........................................... 356/497

(56) References Cited

U.S. PATENT DOCUMENTS 6,744,518 B1 * 6/2004 Dress et al. ................. 356/450
6,762,844 B1 * 7/2004 Dress et al. ................. 356/484

* cited by examiner

Primary Examiner—Gregory J. Toatley, Jr.
Assistant Examiner—Patrick Connolly (57) ABSTRACT

The disclosed Quantum Optical Coherence Tomography apparatus and method includes a source of quantum entangled photons and a quantum interference device. The pair of entangled photons is divided into two beams, one of which illuminates a semi-reflective object and the second of which is reflected from a variable optical time-delay element (VTE). The VTE is scanned and the quantum interference in the QID is recorded to build up a reflectance profile of the object. A real scanning produces a full tomographic reflectance image. A method of processing the data to eliminate the effects of optical dispersion is disclosed.

6 Claims, 5 Drawing Sheets

QUANTUM OPTICAL COHERENCE TOMOGRAPHY DATA COLLECTION APPARATUS AND METHOD FOR PROCESSING THEREFOR

CROSS-REFERENCE TO RELATED APPLICATIONS

Not applicable

STATEMENT REGARDING FEDERALLY SPONSORED RESEARCH OR DEVELOPMENT

Not applicable

REFERENCE TO COMPACT DISK APPENDIX

Not applicable

BACKGROUND OF THE INVENTION

The present invention generally relates to the field of three-dimensional imaging techniques in general and, more particularly, to optical tomography and to Optical Coherence Tomography in specific. Tomography in general is a technique for building up a full three-dimensional image of a non-planar object out of a series of two-dimensional image slices through that object. Perhaps the most popular example of this technique is X-Ray Computed Axial Tomography (CAT) scanning where the object is most easily observed from the "sides"; that is, the object generally has only one long dimension and two relatively short dimensions (like a human body) However, another technique, Optical Coherence Tomography (OCT) has become a versatile and useful tool in fields such as biophotonics where the sample being image is typically best observed from the "top"; that is, the object generally has one short dimension and two longer dimensions (like a tissue sample). OCT is a form of range-finding that makes use of the second-order coherence of a classical optical source to effectively section (or level slice) a partially reflective sample with a resolution governed by the coherence length of the source. Sources of short coherence length (and consequently broad spectrum), such as superluminous LEDs or ultrashort laser pulses, are therefore used in OCT. Operationally, the sample (object) is placed in one arm of an interferometer and illuminated through a beamsplitter with short coherence length light. Light is reflected from all depths within the sample (in proportion to the localized reflectivity) and returned towards the beamsplitter. Simultaneously, a mirror in the second arm of the interferometer is also returning a portion of the original beam to the beamsplitter. Recombined at the beamsplitter, the two beams are directed towards one or more detectors, where they are combined with each other. The combined beams coherently interfere only when the optical path lengths to the sample and to the mirror are equal. Thus, the presence and strength of interfering light in a detector is indicative reflectance of the sample at a depth into the object corresponding to the reference mirror position and at the spatial location corresponding to the location of the detector. If an array of detectors is placed in the sensing plane, an entire level-slice can be recorded simultaneously. The full three-dimensional image is built up by scanning the mirror and recording the thus obtained level slices. Alternatively, a single detector is used and spatial scanning over the object produces the level slices.

OCT is subject to two significant limitations; first, the signal of interest is inherently low contrast since the modulated interference signal rides on a non-modulated self interference background. Secondly, optical dispersion in the object reduces the depth resolution capability of OCT; basically dispersion changes the optical path length within the object as a function of wavelength, which in turn makes the different wavelengths that make up the short coherence length light appear to be coming from different physical depths within the object.

Quantum Interference with entangled photons is a recently developed technology. In Quantum Interference two correlated photons are generated from one source. One photon is typically used as a part of a probe beam while the second photon is part of a reference beam. The "experiences" of the probe photon can then be determined by bringing both photons into a Quantum Interference Device. Measurements are performed by adjusting the conditions for interference and observing the rate of coincident detections of the two photons on individual detectors. The theory of Quantum Interference has been described in the scientific literature and is not reproduced here.

The inventors have advantageously used Quantum Interference (QI) in previous inventions such as an apparatus and method for measuring Polarization Mode Dispersion (PMD), as disclosed in U.S. patent application Ser. No. 10/147,149. They now apply the QI phenomenon to address the limitations of OCT. Unlike classical interference phenomena, QI is insensitive to background radiation. Similarly, the QI signal does not have an intensity dependent background; there is none of the self-interference that sometimes dominates the desired cross-product interference in classical interferometry. Similarly, QI can be configured to be insensitive to dispersion effects that can make a classical measurement impossible.

Thus it is desirable to apply QI to Optical Coherence Tomography to perform Quantum Optical Coherence Tomography. One benefit of QOCT is the reduction of the deleterious effect of background light. Another benefit is the ability to tomographically image objects with highly dispersive material. Yet another benefit is an inherent improvement in signal-to-noise ratio that comes from the elimination of the self-interference of the probe and reference beams.

BRIEF SUMMARY OF THE INVENTION

The present invention relates to an apparatus and method for forming tomographic images of semi-reflective objects, such objects being typified by biological tissue samples. The apparatus comprises a source of quantum optically entangled photons, or twinons. Twinons are photon pairs, wherein first photon in the pair is correlated to the second photon in at least one of time, wavelength and polarization. The source produces a plurality of twinons which are transmitted through a separation element that provides a first optical path and second optical path along which the twinons propagate. The twinons are divided between the two paths indistinguishably; that is, although the photons in a twinon have unique properties, the separation element must be not be able to determine these properties. The first optical path includes the semi-reflective object being imaged.

The apparatus further includes a remixing element in optical communication with both the first optical path and the second optical path. The remixing element has at least one input aperture and two output apertures. Also, the remixing element, typically a beamsplitter, has a pre-determined beamsplitting ratio, preferably 50:50, so photons entering an input aperture have an equal probability of exiting either output apertures. For beamsplitting ratios other than 50:50 the twinons entering the input aperture are re-emitted through the first output aperture and the second output aperture in statistical proportion in accordance with the beamsplitting ratio. The output apertures of the beam combiner define a third and a fourth optical path.

The apparatus includes an variable optical time-delay element (VTE). Photons passing through the VTE are delayed relative to photons traveling the same physical distance in the surrounding medium. The magnitude of the induced delay is externally variable, typically by the signal processor. The VTE is located in one of the four optical paths although preferably it is located in the second optical path. The apparatus also has a first detector, said first detector in optical communication with the first output aperture and a second detector, said second detector in optical communication with the second output aperture. The signals from the two detectors are transmitted to a signal processor which is adapted to identify coincident detections (CD's) of photons at the two detectors and to determine the rate of said CD's, a CD being the nearly simultaneous detection of a photon on each of the two detectors.

The significance of CD's in entangle photon interference has been well established in the literature and is described by three of the present inventors in the '149 application. Summarily, the key to the invention is understanding that each twinon is a single entity that happens to be made up of two photons. The behavior of one photon is correlated with the behavior of the other, even when they appear to be in separate locations. When a twinon traverses an optical system in which there are multiple indistinguishable paths, quantum optical interference determines in which of the paths the photons will be detected. For example, destructive interference can prevent two different detectors from observing a photon simultaneously while quantum optical constructive interference can "force" one photon to appear at each detector. Thus, in the absence of any differential delay (viz., difference between the delay induced by propagating to different depths in the semi-reflective object and the delay introduced intentionally by the VTE) between the two twin photons, quantum-interference effects can either eliminate or reinforce coincident detections ("CD's") on two separated detectors. Therefore, a dip or peak in the CD rate relative to the mean value is an indication that the time delay in the paths leading to the two detectors has been equalized.

In another aspect the invention comprises a method for forming tomographic images of semi-reflective objects. The method includes the step of generating a plurality of entangled photon pairs (twinons) and indistinguishably separating the plurality of twinons into a first and a second optical path. For the photons in the first optical path the method includes the step of reflecting those photons off of the semi-reflective object being imaged. The method continues with the step of indistinguishably combining the photons from the two optical paths and re-emitting the photons into a third optical path and a fourth optical path. The method includes the step of variably delaying the photons in one of the optical paths after which comes the step of detecting the photons in the third optical path with a first detector and the photons in the fourth optical path with a second detector.

The method continues with the step of determining the rate at which there are coincident detections of photons in the first detector and the second detector. Additionally the method includes the step of incrementing the variable delay in one of the optical paths and repeating the coincident detection rate for the new delay. These last two steps are performed repeatedly until the entire depth of the object being measured is sampled.

Additionally, in an other aspect, the invention includes a scanning mechanism in by which the entire area of the sample may be probed, the sequence of areal scanning and depth scanning being arbitrary.

In yet another aspect the invention comprises a method of processing the data collected from a quantum optical coherence tomographic imaging apparatus. The method comprises a first step of measuring the coincident detection rate, as described above, at one particular pump source wavelength at a predetermined number of measurement locations on the object, as defined by the set of coordinate points {x,y}; a second step of varying the pump source wavelength (using know frequency tuning methods such as temperature tuning, for example, or post-emission frequency shifting methods such as acousto-optic modulation, for example, and repeating the coincident detection rate measurement. A third step of repeating the frequency shift/measurement cycle over a pre-determined range of pump laser wavelengths. A fourth step of mapping the measured coincident rate data for each object location as a two-dimensional function of time delay and pump wavelength, said function being recognized as the Wigner Distribution Function of the reflectance profile transfer function, $H(x,y;\omega)$, where x,y is the measurement locations and the variable $\omega$ is the angular frequency of the light. A next step of inverting the WDF to determine $H(x,y;\omega)$ at each of the measurement locations, and a final step of applying the Fourier transformation to H to achieve the reflectance profile at that location.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING

The foregoing and other objects, features and advantages of the invention will become apparent from the following description in conjunction with the accompanying drawings, in which reference characters refer to the same parts throughout the different views. The drawings are not necessarily to scale; emphasis has instead been placed upon illustrating the principles of the invention. Of the drawings.

DETAILED DESCRIPTION OF THE INVENTION

Optical coherence tomography (OCT) is a technique for probing the depth ("z") reflectance profile of semi-reflective objects, for example biologic tissue, in the same sense that SONAR can probe the thermal layers of the ocean using sound reflectance. SONAR is a first order effect, meaning it measures the strength of the returning signal as a function of time, so it requires transmission of a short temporal ping to achieve depth resolution. Because light travels so much faster than sound a first order light measurement is impractical in thin samples; therefore, OCT uses a second order effect, meaning it measures the interference strength between the probe and a scanned reference signal. OCT achieves depth resolution by using short coherence length radiation. The present invention, Quantum OCT (QOCT), is a fourth order effect, meaning it measures the quantum optical interference statistically observed in a beam of so-called entangled photons. The operation of the QOCT imager is best understood in comparison with a conventional OCT imaging system.

Figure 1:
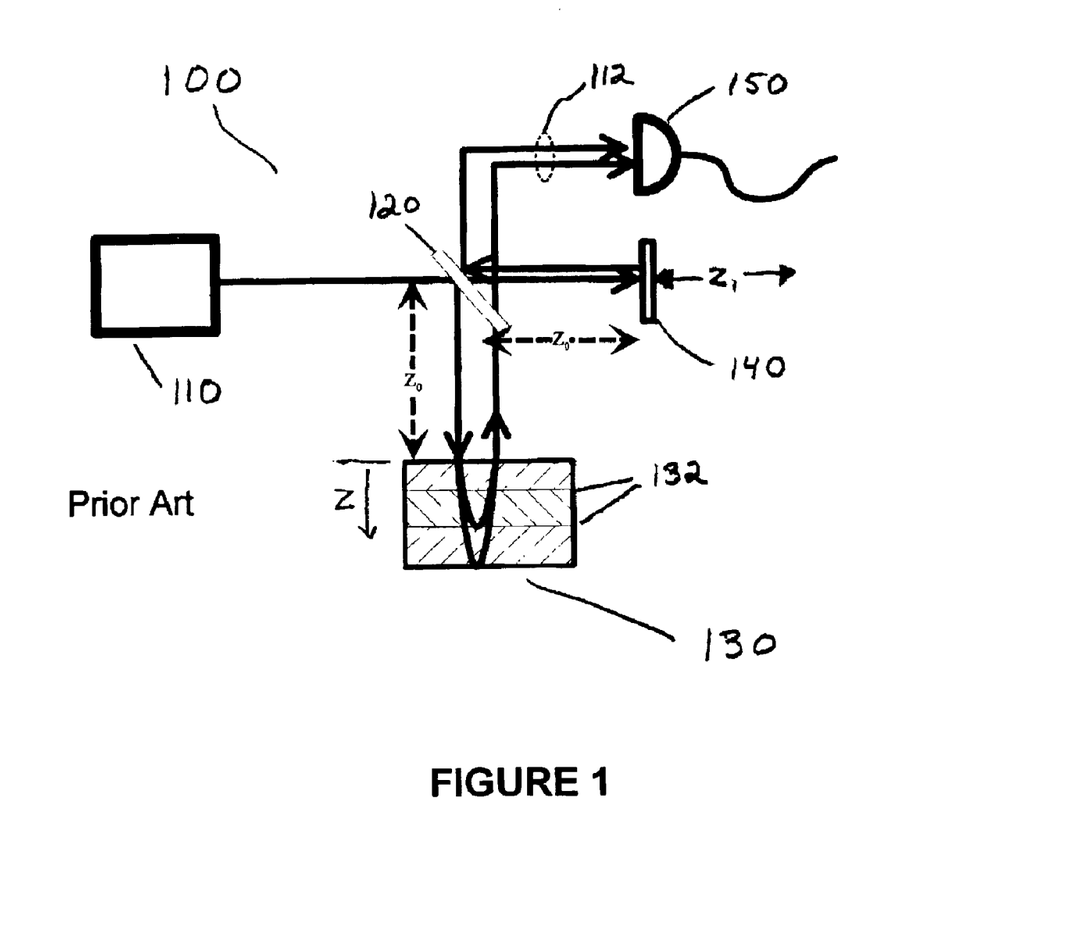
FIG. 1 is a highly schematic diagram of a prior art optical coherence tomography (OCT) imaging apparatus.

A conventional OCT system 100 is illustrated in FIG. 1. A beam of photons is generated by a short coherence length, classical source 110 and propagated to a beamsplitter 120. Typically the beamsplitter has a 50:50 beamsplitting ratio, so approximately half the photons are directed toward as a probe or object beam to an object 130 at a distance $Z_0$, this object comprising several layers 132. The remaining photons, becoming a reference beam, are directed to a reference mirror 140 located at substantially the same distance, $Z_0$, from the beamsplitter 120. Reference mirror 140 is mounted on a slide that varies the distance between the mirror 140 and the beamsplitter 120 over a predetermined range, $Z_1$, corresponding to the expected optical depth of the object 130.

The object 130 can be modeled as a thin, planar sample positioned generally perpendicular to the probe beam; additionally the object can be modeled as having a reflectance transfer function, $H(x,y; \omega)$, where the coordinates $\{x,y\}$ indicate where the beam of photons enters the object (in the plane substantially perpendicular to the beam) and $\omega$ is angular frequency of the light. $H(x,y; \omega)$ has a Fourier transform relationship with the actual reflectance profile $h(x,y;z)$, where z is the variable of interest, indicating depth into the object. Typical objects of interest include biological tissue samples and multi-layered semiconductor or optical materials. Typically, these objects are made up of partially transparent layers of different index of refraction materials. Generally, then, Fresnel reflections at the interfaces between the layers determine the object's reflectance profile as a function of depth; thus, for these objects, $h(x,y;z)$ is a series of variable height, narrow peaks. The separation between the peaks corresponding to the thickness of the layers and the height of the peaks corresponding to the index-difference-generated reflectances at the interfaces between the layers.

Returning to FIG. 1, the photons reflected from the object 130 and the reference mirror 140 return generally along their original paths to beamsplitter 120 where they merge to form a combined beam 112. One portion of the combined beam is directed to an optical detector 150 where the intensity of the beam is sensed. The intensity of the combined beam is determined by the coherent interference between the reference and object beams. As is well known in classical optical interference, the total intensity so formed is the sum of three terms: the intensity of the object beam by itself, the intensity of the reference beam by itself, and a cross-product term whose magnitude is proportional to the amplitudes of the two beams and their mutual coherence.

In OCT the signal of interest is the cross-product term. The cross-product term is modulated by a sinusoid that depends on the optical phase difference between the object and reference beams. As the reference mirror is moved axially by ½ of a wavelength, the phase difference changes by 2 pi radians and the sinusoid varies by one complete cycle. The cross-product term is separated from the self-interference terms by detecting the envelope of this modulation.

Figure 5:
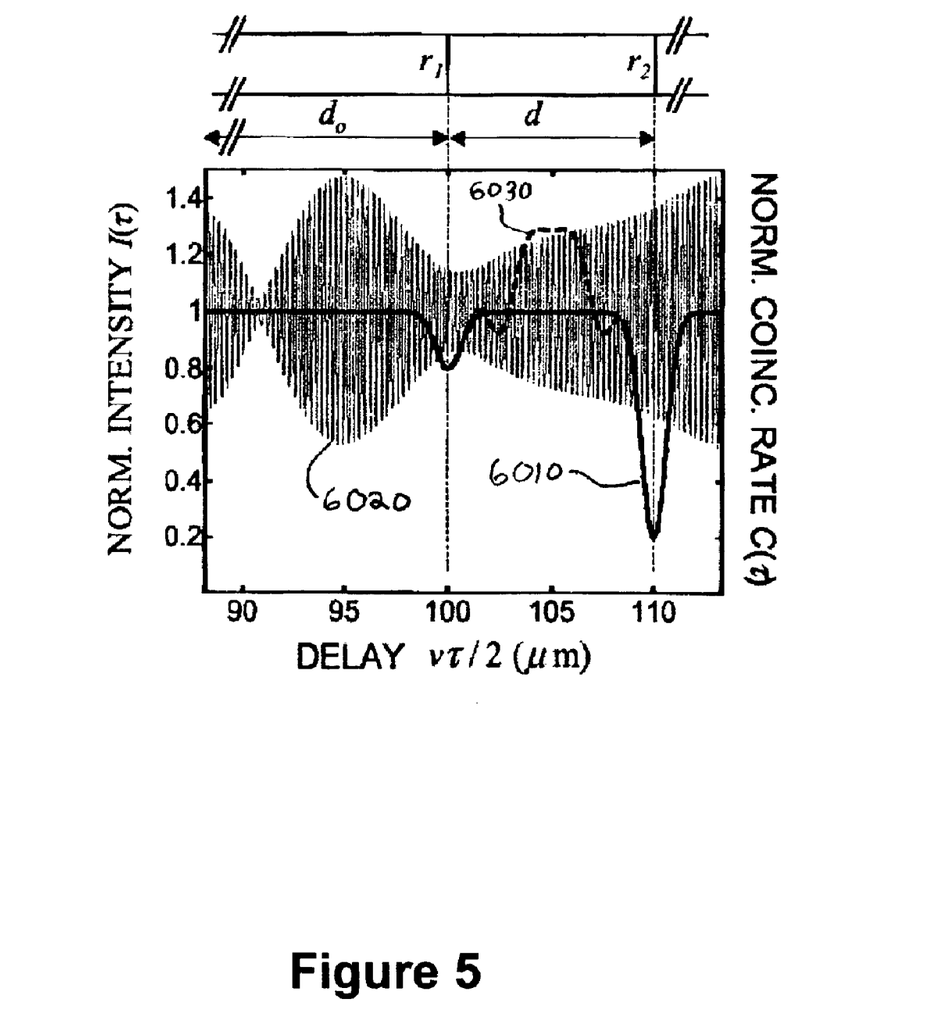
FIG. 5 illustrates analytic model results from both the prior art and the present invention for a first, two layer object.

Since the object 130, as modeled, comprises several layers 132, the object beam consists of multiple returning sub-beams, one from each layer, with the strength of each sub-beam being proportional to the reflectance of that layer. All of the returning beams are present on detector 150 simultaneously. In order to differentiate between these returning beams and achieve depth resolution, OCT uses a short coherence length source such as a superluminous LED. With such a source, the mutual coherence function between the reference beam and any one of the sub-beams is zero unless the optical path lengths traveled by both beams are very nearly equal. Thus, as the reference mirror 140 is scanned over its range $Z_1$, the cross-product term for the sub-beam from any one layer is generally zero unless $Z_1$ matches the optical depth of that one layer inside the object. Therefore, the location and reflectance of each layer is measured in OCT by scanning the reference mirror and detecting the envelope of the fringes sensed in the detector 150. The modulated signal in FIG. 5 illustrates the appearance of an OCT signal.

Figure 2:
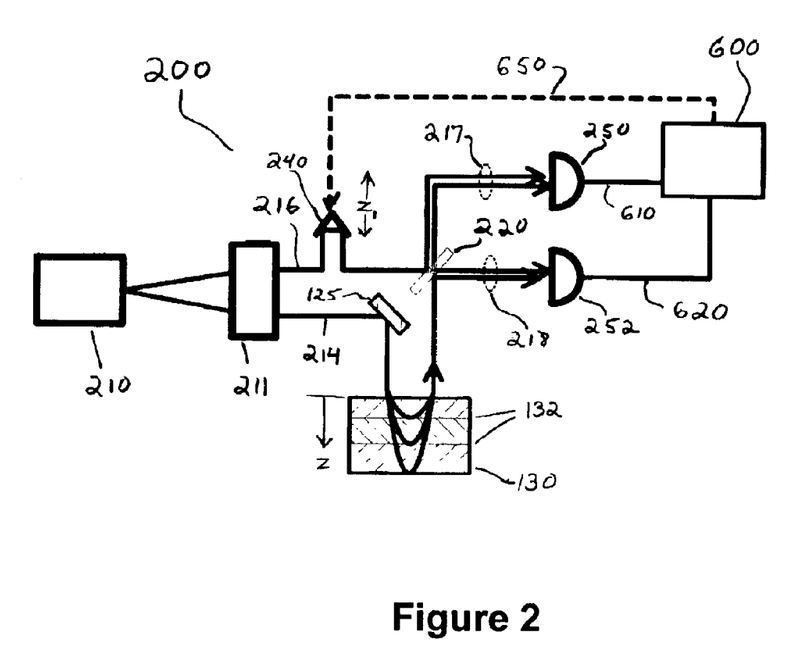
FIG. 2 is a highly schematic diagram of a quantum optical coherence tomography (QOCT) imaging apparatus according to the invention.

In contrast to OCT, the present invention, Quantum Optical Coherence Tomography (QOCT), uses a Quantum Optical Source (QOS) and a Quantum Interference Device (QID) to measure the reflectance transfer function, $H(x,y; \omega)$. The operation of a quantum optical source and a QID have been described in the inventors' pending '149 application, which is incorporated herein by reference. As illustrated in FIG. 2, the QOCT apparatus 200 comprises an entangled photon source (the QOS) 210, which generates a plurality of entangled photon pairs or twinons. A beam separation element 211 directs the twinon beam into an object beam 214 and a reference beam 216. The apparatus further comprises a remixer element 220 that combines the beams and re-emits them into two additional optical paths that lead respectively to two detectors 250, 252. A variable optical time-delay element (VTE) 240 is included in any one of the optical paths to provide phase equalization between twinon photons. The signals from the detectors are sent to an electronic signal processor.

Figure 3:
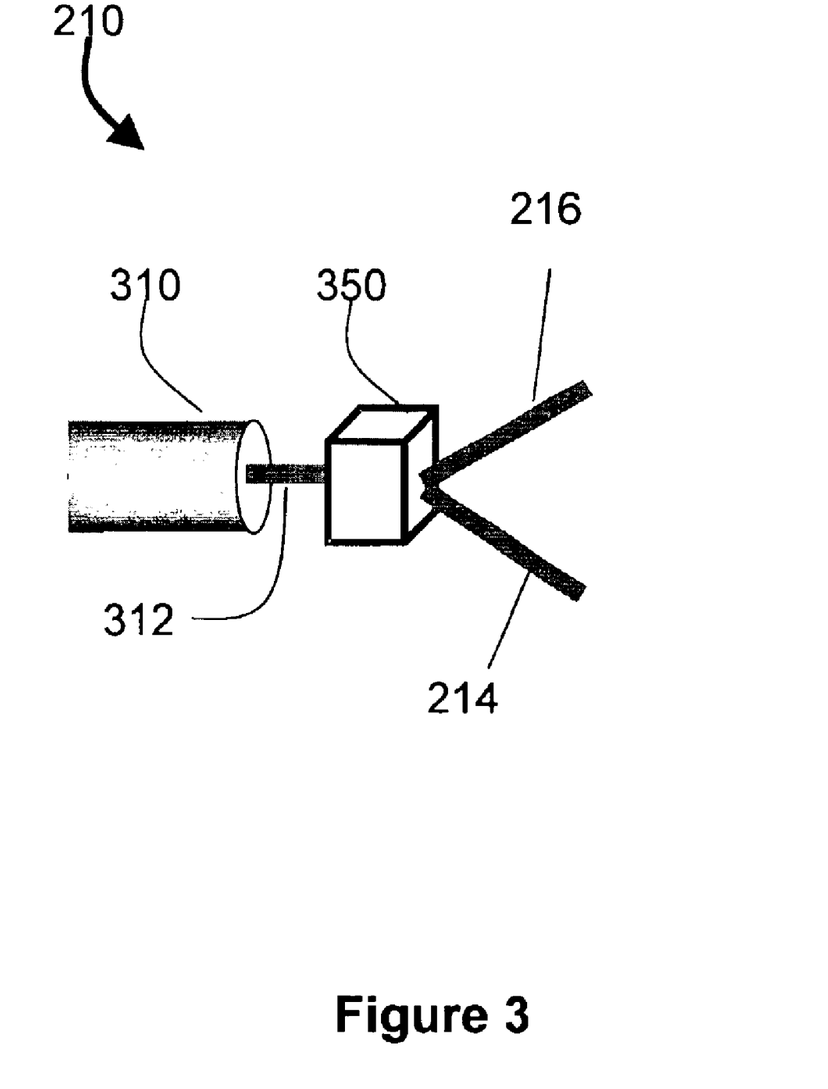
FIG. 3 is a highly schematic diagram of a twinon source.

The preferred embodiment of the QOS 210 uses spontaneous parametric downconversion (SPDC). A schematic depiction of the QOS is shown in FIG. 3. The entangled photon source 210 includes a pump laser 310 and a nonlinear crystal 350. A monochromatic beam of light 312 of wavelength $\lambda_p$ from pump laser 310 is transmitted through the preferred second-order nonlinear crystal (NLC) 350. The intensity of pump laser beam 312 is sufficient to cause nonlinear effects such as SPDC in crystal 350. In SPDC, the frequency of the emitted photons is lower ("down converted") than the pump frequency, so their individual energies must be lower. Since energy and momentum are conserved in the process, the downconverted photons are emitted in pairs (twinons) where the twin photons share the energy and momentum of the pump photon. This sharing entangles the momenta of the twin photons such that the emission of one photon in a given direction is associated with the simultaneous emission of its twin in a complementary direction.

FIG. 3 illustrates one typical embodiment for QOS 210. The pump laser 310 is preferably a single-mode diode laser. The wavelength of pump laser 310 is determined by the wavelength at which the QOCT is to be performed; because of the non-linearity of the SPDC process, the wavelength of the pump is selected to be substantially one-half the wavelength desired for the imaging process. The inventors have determined that the pump laser power is preferably in the range of 10 to 100 milliwatts to produce a twinon beam of useful power. Other pump sources that produce comparable pump beams may also be used; for example, optical parametric oscillators and Ti:Sapphire lasers (with doublers) have been used previously.

In the preferred embodiment a β-barium borate NLC of thickness 1 mm is used with a pump wavelength $\lambda_p$=406 nm. With the NLC cut at an angle 29° with respect to the optical axis, so-called type-1 SPDC occurs with the emitted twinons having paired wavelengths centered around the degenerate wavelength of 816 nm. Alternatively, LBO, KTP, or lithium niobate are NLC's that have been used advantageously in the past. The twin photons may have the same wavelength (the degenerate wavelength) but they generally differ in wavelength. In the preferred embodiment they have identical polarizations. In all cases, the entanglement persists regardless of the physical separation of the twin photons as long as no measurement that can distinguish one from the other is possible. Additionally the preferred embodiment comprises the case in which these photons are emitted in different directions (non-collinear configuration).

The mean direction of the emitted twinon beams 214,216 is substantially parallel to pump laser beam 312, while the individual beams propagate substantially symmetrically about the mean direction. A filtering element (not illustrated) is typically placed in the emitted beams to eliminate any unconverted pump laser photons from the desired twinon beams. The filtering element is typically an optical interference filter, a dispersive prism (illustrated) or grating element. Preferably the entire source 210 is maintained at a constant temperature to stabilize the characteristics of the twinon beam. Typically in electro-optical systems temperature is maintained actively by thermal isolation and Pelletier heater/coolers (not illustrated).

Returning to FIG. 2, each of the twinon beams 214, 216 leave the QOS 210 and enter beam separation element 211, which separates and directs the beams in the object beam 214 and the reference beam 216. For the preferred non-collinear source, beam separation element 211 may be implemented simply by a region of free space propagation although, preferable, an appropriate combination of reflective and transmissive elements is used to redirect the twinon beams. More preferably the beam separation element 211 will couple each twinon beam into an optical fiber, making the source easily adapted for systems already familiar in the OCT art.

One beam leaving QOS 210 is designated to become object beam 214. The object beam is directed along a first optical path to the surface of the object 130, perhaps with auxiliary optics shown notionally in the figure as turning flat 125. Object 132, being a semi-reflective object, allows a portion of beam 214 to penetrate its surface and probe the interior structure. In the simplified model, object 130 comprises one or more layers 132 of different index-of-refraction material, each layer being at a specific depth in the Z-direction. As is well know in optics, partial reflection of light occurs whenever there is an interface between two materials of different indices-of-refraction, with the magnitude of the reflection coefficient depending generally on the magnitude of the difference. Thus, object beam 214 is reflected as a series of sub-beams (not illustrated separately) from the layers 132 in object 130. These reflected sub-beams propagate to remixer element 220.

The second beam leaving QOS 210 is designated to become the reference beam 216. Reference beam 216 propagates to the remixer element over a second optical path whose length is generally equal to the optical path traversed by object beam 214. Preferably this optical path contains a variable optical time-delay element (VTE) 240. The VTE, illustrated schematically as a corner cube, moves axially over a range $Z_1$. The range $Z_1$ is pre-determined to be equal to the range of optical depths spanned by the layers 132 in object 130.

Remixer element 220, typically a nominally 50:50 beamsplitter, comprises at least one input aperture and two output apertures. The remixer combines object beam 214 and reference beam 216 indistinguishably; that is, when the twinons emerge from one of the two remixer output apertures there is no way of identifying from which of the two beams 214, 216 they originated.

The combination of the remixer 220 and the two detectors 250, 252 comprise a Quantum Interference Device (QID). As shown in FIG. 2, the remixer 220 preferably has both two input apertures and two output apertures and provides two alternative optical paths for the twinons coming from the object and reference beams. In the preferred embodiment, the separation element 211 is a substantially non-polarizing beamsplitter in which light is split into two substantially equal beams; the transmitted object and reflected reference photons propagate along a third optical path 217 and the reflected object and transmitted reference photons propagate along a fourth optical path 218. One of the benefits of using quantum optical effects is that separation element 211 may deviate from the ideal 50:50, non-polarizing example without introducing errors in the image measurement. The primary effect of deviations from the ideal is to increase the measurement time required to achieve any specific signal-to-noise ratio image.

The third optical path 217 includes a single optical detector 250, said detector capable of detecting single photon events and optionally a polarization analyzer (not illustrated). Any photon directed into that path by separation element 211 may have become polarized in either of the two possible orthogonal polarizations during reflections in the system. The polarization analyzer is oriented with its polarization axis substantially half way between the two possible polarizations, allowing both polarizations to pass with equal probability and thereby ensuring that detector 250 cannot differentiate between the two photons that make up the twinon. Detector 250 produces an electrical pulse output on a signal line 610 each time it senses a photon.

Detector 250 is adapted to detect single photon events. In the preferred embodiment, for the wavelengths of interest, detector 250 is a Avalanche Photo Diode (APD). Further, the preferred embodiment uses an actively quenched, Pelletier-cooled APD. Alternative detectors that can be used (depending on system wavelength bands) are photomultiplier tubes and intensified photodiodes.

The fourth optical path 218 also includes a single optical detector 252, said detector capable of detecting single photon events and, if used in the third optical path, a polarization analyzer (not illustrated). The polarization analyzer, if used, is oriented with its axis parallel to the polarization axis in the third optical path 217 Detector 252 is substantially identical to detector 250. Detector 252 produces an electrical pulse output on a signal line 620 each time it senses a photon.

Returning to FIG. 2, the signal output line 610 for detector 250 provides an input signal to the processor 600 and the output signal line 620 for detector 252 provides an input signal to the processor 600, wherein each detector output signal indicates the arrival of a photon at the respective detector.

Figure 4:
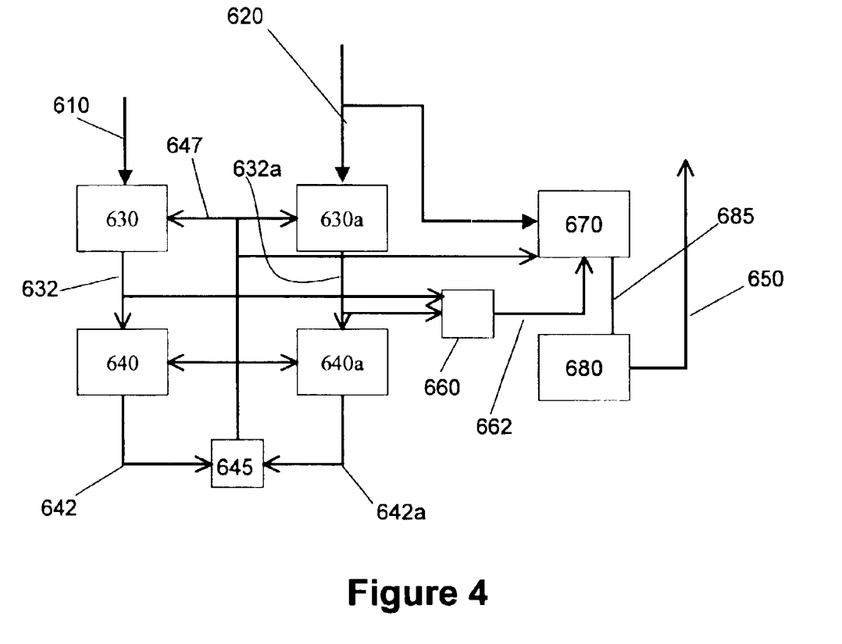
FIG. 4 is block diagram of a processor for the invention.

Processor 600 generally provides two functions. First, it identifies and records the rate of simultaneous photon detections, or coincident detections (CD's) in the two optical paths 217, 218. Second, processor 600 generally controls the delay of VTE 240. As the processing logic illustrated in FIG. 4 shows, processor 600 accepts logic level signals from detectors 250, 252 on signal lines 610 and 620 respectively. Signals on these lines trigger latching OR gates 630, 630a respectively. The output signals 632, 632a from OR gates 630, 630a in turn trigger timing circuits 640, 640a respectively. Each timing circuit, once triggered, runs for a pre-determined gate time, said gate time being substantially equal to the maximum expected time delay in the object 130. The gate time is the time window within which a coincident detection is allowed. The length of this gate time also limits the rate at which source 210 may emit twinons, since spurious CD's will be recorded if more than one twinon can be in the QID during the gating interval. The gate time is typically between 1 and 2 nanoseconds. When either timer 640 or 640a reaches the pre-determined gate time, said timer sends a logic signal to an OR gate 645. The OR gate 645 generates a reset signal 647 when it receives a signal from either timer. The reset signal 647 is distributed to OR gates 630, 630a, timers 640, 640a, and an analyzer 670. The reset signal marks the end of the allowable gate time for coincident detections and erases the processor memory of the first photon detection.

Output signals 632 and 632a are also transmitted to an AND gate 660. The AND gate 660 generates an output signal 662 when a CD occurs (viz., detections are indicated on both gate inputs). Signals 620 and 662 form the primary inputs for analyzer 670. Additionally, processor 600 includes a time delay controller 680. Controller 680 is responsible for incrementing the VTE 240 during the measurement. Typically, controller 680 provides an analog signal to the VTE over line 650 and sends a digital increment count to analyzer 670 over line 685.

Internally (not illustrated), analyzer 670 comprises a digital accumulator and an array of M storage registers, where M is the number of time delay increments. During operation, the accumulator latches any signal coming from line 620. If a CD occurs, line 662 goes high and the latched input is added to the corresponding accumulator. This process continues during the integration period for the current time delay increment. At the end of the integration time for the current time delay increment, controller 680 sends a signal to analyzer 670 on line 685. Said signal causes analyzer 670 to transfer the accumulated CD counts from the accumulator to the aforementioned register. The accumulator are then reset to zero.

When either timer 640 or 640a reaches the pre-determined gate time, said timer sends a logic signal to an OR gate 645. The OR gate 645 generates a reset signal 647 when it receives a signal from either timer. The reset signal 647 is distributed to OR gates 630, 630a, timers 640, 640a, and analyzer 670. The reset signal marks the end of the allowable gate time for coincident detections and erases the processor memory of the first photon detection.

After reset, the VTE is moved to a new delay value and the process repeated to measure the CD rate at a new time delay, corresponding to a new depth inside object 130.

The process described above profiles the reflectance as a function of depth, z, at one point in the x-y plane. It will be obvious to one skilled in the art that a full three dimensional image of an object can be obtained by scanning the object beam 214 over the area of the object. Such scanning can be performed in any order relative to the VTE scanning required to measure reflectance over the depth of the object.

It will be understood that the processor 600 may be configured in many equivalent ways to perform the above described functions and that a specific embodiment is described here only for purpose of illustration of the processing logic required by the invention.

System Operation

Returning to FIG. 2, in operation, after transmission through object 130 or VTE 240, each twinon enters remixer 220 and is presented with two potential optical paths to follow, path 217 and path 218. There are two cases of expected behavior to consider; when the two twin photons are separated in time by longer than their entanglement length (that is, when they become distinguishable from each other) and when they are essentially coincident in time (or indistinguishable). The operation of the invention will be described by first considering the former case and then considering what happens as the variable delay is introduced to match the round trip delay through the object 130.

In the first case (viz., where there is a delay between the twinons), the optical components in the QID behave as would be expected using classical optics. Each of the two photons has a 50% probability of being either reflected or transmitted by separation element 211. In path 217 the photons impinge on detector 250. An output pulse is generated and sent to processor 600. Similarly, in path 218 the photons impinge on detector 252. An output pulse is generated and sent to processor 600. Processor 600 identifies and records coincident detections of photons the two detectors. Half of the time the two photons propagate separately down the two paths and trigger a CD, which is noted by the processor. The other half of the time both photons travel down the same path (either path 217 or path 218). These photons arrive at the same detector and do not trigger a CD. The rate of CD's in the presence of a delay is the baseline rate.

In typical operation, processor 600 continually monitors the detectors to record the rate of CD's while it (or an auxiliary processor) slowly adjusts VTE 240 over the range of expected delay. As the magnitude of the inserted delay approaches the delay in the object (that is, the delay to and from one layer), the entangled photons start to overlap and to become indistinguishable (in the quantum-optical sense). At that point the classical optics model breaks down.

Now consider the behavior of the QID for entangled photons that are indistinguishable. The twinon, being a single entity, must be discussed in terms of a "wave function" that effectively describes both photons simultaneously in terms of the probability of detecting a photon at the detectors. The wave function also reveals how changes in the optical system affect the expectation value for a detection at one detector even when the changes take place in a separated optical path. In the context of the present invention, the inventors have both calculated the wave function predicting, and confirmed experimentally, that introducing a delay of the correct magnitude re-establishes the indistinguishability of the twinon.

When the photons are in the fully indistinguishable condition, the wave function predicts that either constructive or destructive quantum interference will occur. For the QID this means that either there will be a very high rate of CD's (approximately double the baseline rate established for the incoherent case) or there will be a very low rate of CD's (approaching zero). Which case obtains is determined by the specific configuration of the optical elements in the QID. In the preferred embodiment, destructive interference occurs, so there will be a null in the CD rate when the inserted delay matches the round trip object delay.

There is, of course, a transition between the entangled and un-entangled states. As with OCT, the resolution of the null in the CD is dependent on the bandwidth of the twinons. Using the preferred non-collinear SPDC, each of the emitted twinons in its own right has a broad wavelength spectrum, so the entanglement length is short, providing depth resolution.

In the QOCT application only a fraction of the twinons are reflected from any interface. Thus, the time delay at which a dip in the CD rate occurs corresponds to the depth of the layer inside the object whilst the percentage dip in the CD from the baseline corresponds to the fraction of twinons reflected at that interface. The method for collecting QOCT tomography data is therefore quite simple; twinons are generated by the QOS and propagated into the object and reference paths. The processor accumulates CD's for a pre-determined time, said time being selected to achieve a pre-selected signal-to-noise ratio. After the end of the pre-determined time, the delay introduced by the VTE is incremented by a predetermined step, said step being finer than the depth resolution of the quantum interference.

Modeled results of QOCT are illustrated in FIG. 5. The modeled object comprises two layer interfaces of differing reflection coefficients and materials that are highly dispersive. The figure includes the calculated QOCT response 6010, the calculated OCT response 6020 (for comparison) and calculated QOCT response to dispersion 6030. Discussion of the effect of dispersion is deferred to the next section. As illustrated in the figure, the (normalized) baseline CD rate is established when the VTE delay (abscissa) is significantly different from the object delay (the two interfaces were modeled at delays equivalent to 100 and 110 microns depth). As the VTE delay is incremented into the general region of the interfaces, the QOCT response 6010 dips, first to 80% of the normalized rate at 100 microns and then to 20% at 110 microns. These two dips indicate the two interfaces. It is important to note that at all values of the delay the same number of photons are being reflected from the object and the VTE. The dips in the QOCT response do not represent fewer photons reaching the detectors; rather, the dips represent few than "normal" times that one photon of the twinon pair reaches each detector (that is, both photons are arriving at the same detector).

Method of Processing to Eliminate Dispersion

As shown in FIG. 5, QOCT in dispersive materials generally produces spurious CD signals. As modeled for the figure the spurious signal 6030 appears as a bump in the CD rate, or, not illustrated, it may appear as extra dips. The spurious signals are the result of dispersion causing pairwise quantum interference between the various interface reflections. The OCT response 6020 shows how dispersions totally eliminates the useful information in OCT. In the following section we describe how process QOCT signals to eliminate the dispersion error.

Any instrument using an optical wave to probe a medium ultimately measures the ratio H of the amplitude of the sum of all waves reflected from various layers of the medium, to the amplitude of the incident wave as a function of the wave frequency. This function, called the transfer function, carries information on the properties of the medium as a function of the axial distance.

In conventional OCT, the transfer function is determined by calculating the Fourier transform of the envelope of the interferogram. Given H, the computation of the medium properties is usually based on a physical model of the medium. When the medium is dispersive the axial resolution is reduced, particularly at greater depths.

In quantum OCT, the interferogram is the photon coincidence rate as a function of the delay introduced by the VTE. The twinons are broadband waves with frequencies centered around a degenerate frequency (half the frequency of the pump). A Fourier transform of the interferogram yields the product of the medium transfer function H at pairs of frequencies, equally positioned above and below the central frequency. Knowing this product, one cannot in general unambiguously estimate H. However, the product is insensitive to the dispersion encountered by each individual reflection. It may therefore be used together with a physical model of the medium to obtain estimates of the medium parameters with improved axial resolution.

A preferred technique of fully estimating H is to measure the interferogram at a range of values of the central frequency. This is accomplished by varying the frequency of the pump, by use of frequency tuning techniques or acousto-optic modulators. The coincidence rate as a 2D function of the time delay and the central frequency is the Wigner Distribution Function (WDF) of the unknown transfer function H. It is well known that a function may be uniquely determined given its WDF. However, if a physical model of the medium is known, measurement of the quantum interferogram at only a few different central frequencies may suffice to estimate the unknown parameters of the physical model.

For example, for media with sufficiently separated layers, the measured quantum interferogram yields one dip for each reflection. The location and height of each dip identify the position and reflectance of the layer. Such dips, called primary dips, are insensitive to the central frequency and to even-order dispersion. In addition, the quantum interferogram also has one dip or hump for each pair of different layers. These secondary dips/humps are located at delays corresponding to exactly mid positions between the primary dips. Secondary dips/humps are highly sensitive to the central frequency and are broadened by dispersion. If the central frequency is changed, the primary dips remain unchanged, but a secondary dip can change into a hump or vice-versa. This permits us to identify and separate primary dips from secondary dips/humps. The primary dips provide information on the location and reflectance of the layers, while the secondary dips/humps provide information on the dispersion introduced by the medium in between the corresponding pair of layers.

If the central frequency used in quantum OCT is swept over an appropriate spectral range, as the interferogram is recorded, the secondary dips/humps are washed out completely, and we are left with the primary dips, which are dispersion insensitive. This method is applicable even if the layers of the medium are not well separated.

An apparatus and several methods of performing QOCT have been disclosed. It will be appreciated that QOCT imagers may be built in different embodiments according to the invention. For example, the VTE may be located in a different optical path or a collinear QOS may be employed with a polarization-based beam separation element. Since certain changes may be made in the above apparatus and methods without departing from the scope of the invention herein involved, it is intended that all matter contained in the above description or shown in the accompanying drawing shall be interpreted in an illustrative and not a limiting sense.

What we claim as our invention is:

1. An optical apparatus for collecting quantum optical coherence tomography data from a semi-reflective object comprising:
   a source of entangled photons, said source generating a plurality of photon pairs (twinons), each of said twinons comprising a first twin photon and a second twin photon, said first twin photon being correlated to said second twin photon in at least one of time, wavelength and polarization;
   a separation element in optical communication with said source, the separation element providing a first optical path and second optical path, the first optical path including the semi-reflective object, said separation element being unable to distinguish the properties of the photons entering the first and second optical paths;
   a remixing element in optical communication with both the first optical path and the second optical path, the remixing element comprising a pre-determined beamsplitting ratio, an input aperture, a first output aperture, and a second output aperture, said remixing element providing a third optical path and a fourth optical path, wherein the plurality of twinons entering the input aperture are re-emitted through both the first output aperture into the third optical path and the second output aperture into the fourth optical path, the twinons being emitted in statistical proportion in accordance with the beamsplitting ratio of the remixing element;
   a variable optical time-delay element, said delay element located in one optical path;
   a first detector, said first detector in optical communication with the first output aperture along the third optical path;
   a second detector, said second detector in optical communication with the second output aperture along the fourth optical path;
   a signal processor adapted to identify coincident detections of photons at the two detectors;
   wherein twinons from the source of entangled photons are emitted into the first and second optical paths, the photons in the first optical path being reflected from the semi-reflective object; the photons in the two optical paths being combined indistinguishably at the remixing element and being re-emitted at the remixing element into the third and fourth optical paths; the photons in the third optical path being detected by the first detector and the photons in the fourth optical path being detected by the second detector; the variable optical time-delay element, being pre-adjusted to a value, T, within a predetermined range, delaying the photons passing through it by T; and the signal processor identifying and determining the rate of coincident photon detections on the two detectors for the delay value T.

2. A method for collecting quantum optical coherence tomography data comprising:
   the step of generating a plurality of entangled photon pairs (twinons), said twinons comprising a first twin photon and a second twin photon, said first twin photon being correlated to said second twin photon in at least one of time, wavelength and polarization;
   the step of indistinguishably separating the plurality of twinons into a first and a second optical path;
   the step of reflecting the photons in the first optical path off of the semi-reflective object;
   the step of indistinguishably combining the photons from the two optical paths and re-emitting the photons into a third optical path and a fourth optical path;
   the step of optically delaying the photons in one optical path, the delay time being pre-determined;
   the step of detecting the photons in the third optical path with a first detector and the photons in the fourth optical path with a second detector; and
   the step of determining the rate at which there are coincident detections of photons in the first detector and the second detector.

3. A method of processing coincident photon detection data generated in a quantum optical coherence tomography apparatus comprising:
   the step of recording the coincident detection rate in the apparatus, as generated from a location on an object, as a function of a variable time delay, for an initial pump laser wavelength;
   the step of incrementing the pump laser wavelength within a pre-determined range;
   the step of recording a set of data comprising the coincident detection rate as a function of variable time delay at each incremented pump laser wavelength;
   the step of processing the recorded set of data; and
   the step of moving the location on the object at which the data is generated,
   wherein the steps of the method are repeated at a predetermined number of locations on the object, those locations being the desired image locations.

4. The method of claim 3 where the step of processing the recorded set of data for each location consists of averaging the data, said averaging to be performed across the various pump wavelength values, at each time delay value, the resulting average data being the coincident detection rate as a function of time delay without regard to pump wavelength.

5. The method of claim 3 where the step of processing the recorded set of data for each location consists of:
   the step of combining the multiple, one-dimensional, data sets into a single, two-dimensional data set, wherein the first dimension is time delay and the second dimension is pump laser wavelength;
   the step of interpreting the two-dimensional data set as the Wigner Distribution Function of an unknown reflectance transfer function;
   the step of inverting the WDF to produce the reflectance transfer function; and
   the step of performing a Fourier transformation on the reflectance transfer function to produce the object's reflectance profile.

6. The method of claim 3 wherein the step of processing the recorded set of data for each location further includes:
   the step of calculating a reflectance profile for the object at the location;
   the step of deconvolving the estimated reflectance profile from the measured data; and
   the step of estimating the optical dispersion from the residual data.

* * * * *